United States Patent
Ladas et al.

(10) Patent No.: US 9,290,102 B2
(45) Date of Patent: Mar. 22, 2016

(54) ENERGY CONVERSION SYSTEM

(71) Applicant: SCHNEIDER ELECTRIC INDUSTRIES SAS, Rueil-Malmaison (FR)

(72) Inventors: Dimitrios Ladas, Grenoble (FR); Yves Perriard, Neuchatel (CH); Christophe Auvigne, Sergy (FR); Paolo Germano, Savigny (CH)

(73) Assignee: SCHNEIDER ELECTRIC INDUSTRIES SAS, Rueil-Malmaison (FR)

(*) Notice: Subject to any disclaimer, the term of this patent is extended or adjusted under 35 U.S.C. 154(b) by 329 days.

(21) Appl. No.: 13/973,296

(22) Filed: Aug. 22, 2013

(65) Prior Publication Data
US 2014/0062400 A1 Mar. 6, 2014

(30) Foreign Application Priority Data

Aug. 28, 2012 (FR) .................................. 12 58039

(51) Int. Cl.
- *H02J 7/00* (2006.01)
- *B60L 11/18* (2006.01)
- *H02M 3/337* (2006.01)
- *H02J 7/02* (2006.01)
- *H02M 5/08* (2006.01)
- *H02J 7/04* (2006.01)

(52) U.S. Cl.
CPC ............. *B60L 11/1812* (2013.01); *H02J 7/022* (2013.01); *H02M 3/337* (2013.01); *H02J 7/04* (2013.01); *H02M 5/08* (2013.01)

(58) Field of Classification Search
CPC ........................... B60L 11/005; B60L 11/1812
USPC .............. 320/107–108, 166–167; 363/15–19, 363/21.08, 21.16
See application file for complete search history.

(56) References Cited

U.S. PATENT DOCUMENTS

| | | | |
|---|---|---|---|
| 2003/0038612 A1 | 2/2003 | Kutkut | |
| 2010/0219696 A1 | 9/2010 | Kojima | |
| 2013/0076306 A1* | 3/2013 | Lee | H02J 7/025 320/108 |
| 2013/0249472 A1* | 9/2013 | Hsu | H02M 7/797 320/107 |
| 2015/0015197 A1* | 1/2015 | Mi | B60L 11/182 320/108 |

OTHER PUBLICATIONS

French Preliminary Search Report issued Jun. 4, 2013, in French Application No. 12 58039 filed Aug. 28, 2012 (with English Translation of Categories of Cited Documents).

* cited by examiner

*Primary Examiner* — Paul Dinh

(74) *Attorney, Agent, or Firm* — Oblon, McClelland, Maier & Neustadt, L.L.P.

(57) ABSTRACT

This electrical energy conversion system, for powering a load using a voltage source, comprises a first capacitor, a second capacitor, two load connection terminals and an electrical transformer comprising a primary winding and a secondary winding. The first capacitor is electrically connected to the primary winding, and the connection terminals are electrically connected to the secondary winding. This system comprises a third capacitor and switching means suitable for switching, reversibly, between a first configuration, wherein the second capacitor is connected in series between the secondary winding and one of the two connection terminals, and a second configuration wherein the third capacitor is connected in parallel with the secondary winding and between the connection terminals of the load. Only the second capacitor is suitable for receiving the flow of an electric current in the first configuration, whereas only the third capacitor is suitable for receiving the flow of the electric current in the second configuration. The conversion system further comprises means for controlling the switching means according to a control algorithm.

10 Claims, 5 Drawing Sheets

ENERGY CONVERSION SYSTEM

BACKGROUND OF THE INVENTION

The present invention relates to an electrical energy conversion system for powering a load using a voltage source. The conversion system according to the invention comprises a first capacitor, a second capacitor, two load connection terminals and an electrical transformer comprising a primary winding and a secondary winding, the first capacitor being electrically connected to the primary winding, and the connection terminals being electrically connected to the secondary winding.

Electrical energy conversion systems comprising a primary winding and a secondary winding are known, wherein each of the windings is connected to a capacitor and the primary winding is connected to an alternating voltage generator and the secondary winding is connected to a load resistor. These conversion systems have different topologies according to the arrangement of the capacitor of the secondary winding, the capacitor of the primary winding being positioned in series between the alternating voltage generator and the primary winding, including a series-series topology, where the capacitor of the secondary winding is connected in series between the secondary winding and the load resistor, and a series-parallel topology, where the capacitor of the secondary winding is connected in parallel with the load resistor and the secondary winding. The use of either of these topologies is suitable, for example, for charging a constant current or constant voltage battery according to the respective use of the series-series topology or series-parallel topology.

However, charging a battery as recommended by the manufacturers requires a first charging step, at constant current, followed by a second charging step, at constant voltage. Charging a battery according to these criteria thus requires means suitable, at the appropriate times, for using either of the above-mentioned topologies for charging a battery.

SUMMARY OF THE INVENTION

The aim of the invention is thus that of proposing an electrical energy conversion system suitable for adapting to battery charging in an optimal manner, i.e. as recommended by the battery manufacturer's data sheet. Such a system is suitable for, besides adapting to each battery, simplifying the control algorithms required in the case of the use of either of the above-mentioned topologies.

For this purpose, the invention relates to an electrical energy conversion system of the type mentioned above, wherein it comprises a third capacitor and switching means suitable for switching, reversibly, between a first configuration, wherein the second capacitor is connected in series between the secondary winding and one of the two connection terminals, and a second configuration, wherein the third capacitor is connected in parallel with the secondary winding and between the connection terminals, only the second capacitor of the second and third capacitors being suitable for receiving the flow of an electric current in the first configuration, whereas only the third capacitor of the second and third capacitors is suitable for receiving the flow of the electric current in the second configuration, the conversion system comprising means for controlling the switching means according to a control algorithm.

According to further advantageous aspects of the invention, the electrical energy conversion system comprises one or more of the following features, taken in isolation or according to any technical possible combinations:

- the switching means comprise a first switch connected between the secondary winding and one of the two terminals of the third capacitor, a second switch connected between the terminal of the third capacitor and one of the two connection terminals, and a switch connected between the other terminal, of the two connection terminals, and the secondary winding;
- the selector switch can be switched between a first position corresponding to the first configuration and a second position corresponding to the second configuration, the first and second switches being open in the first configuration and closed in the second configuration;
- the selector switch is a three-position switch, the first position corresponding to the first configuration, the second position corresponding to the second configuration and the third position being an idle position wherein no current flows through the selector switch;
- the control algorithm comprises a step for cutting off the current flow between the voltage source and the connection terminals, when switching from one configuration to another.

The invention also relates to a station for recharging an electric battery, such as an electric vehicle battery, comprising an energy conversion system, wherein the energy conversion system is according to the invention and wherein the control algorithm is dependent on a battery charging profile.

According to further advantageous aspects of the invention, the recharging station comprises one or a plurality of the following features, taken in isolation or according to any technically feasible combinations:

- the charging profile comprises a charging step at constant current and a charging step at constant voltage, the charging step at constant current corresponds to the first configuration and the charging step at constant voltage corresponds to the second configuration;
- the recharging station further comprises a voltage rectifier connected between the connection terminals, the voltage rectifier being suitable for outputting a direct voltage to the battery;
- the voltage source is a direct voltage source and the recharging station further comprises an inverter connected between the direct voltage source and the first capacitor;
- the recharging station further comprises an inverter control circuit and the control circuit controls the inverter according to a phase shift modulation.

BRIEF DESCRIPTION OF THE DRAWINGS

These features and advantages of the invention will emerge on reading the description hereinafter, given merely as a non-limiting example, with reference to the appended figures, wherein.

DETAILED DESCRIPTION OF PREFERRED EMBODIMENTS

Figure 1:
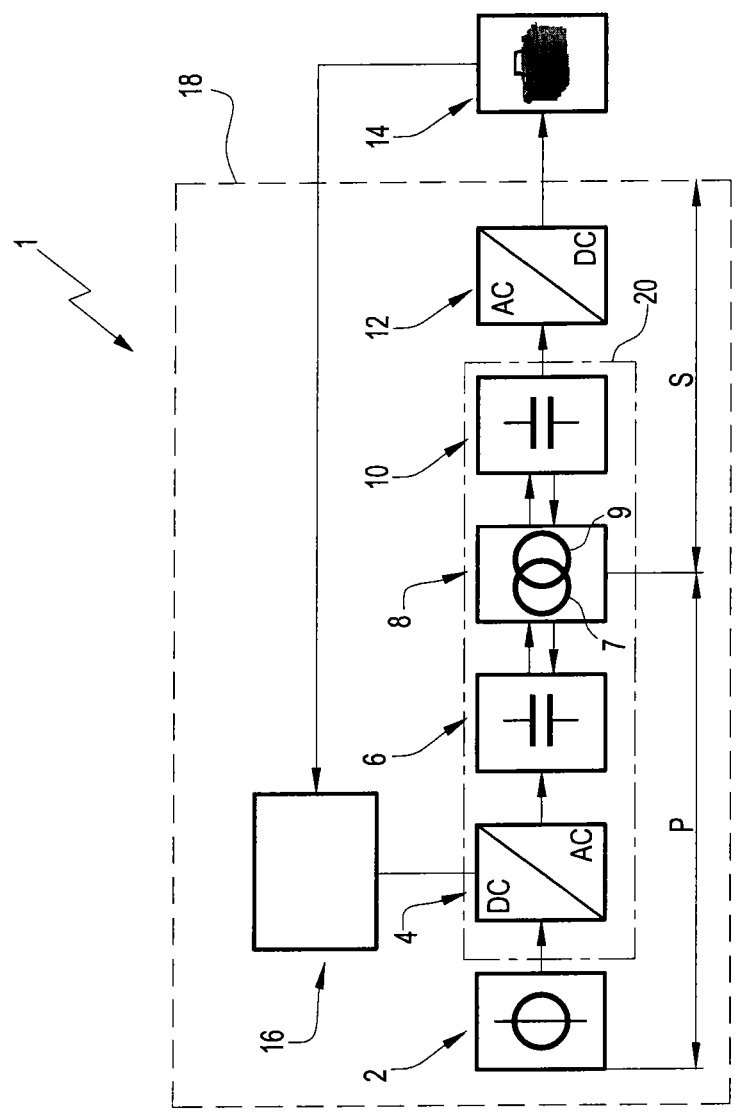
FIG. 1 is a diagram of an electrical energy conversion chain.

In FIG. 1, an electrical energy conversion chain 1 comprises a direct voltage source 2 connected to an inverter 4. The voltage source 2 may consist of a rectifier stage connected to the 50 Hz mains or any other equivalent device. The inverter 4 is connected to a first capacitance 6, in turn connected to a primary winding 7 of a transformer 8. The transformer 8 comprises a secondary winding 9 connected to a second capacitance 10, in turn connected to a voltage rectifier 12. This rectifier 12, suitable for converting an alternating voltage into a direct voltage, is connected to a load such as a battery 14. A control and communication circuit 16 is connected between the battery 14 and the inverter 4. This circuit 16 is suitable for controlling the inverter 4, according to phase shift modulation. Alternatively, other types of control may be used. The communication part of the circuit 16 is suitable for collecting voltage and current information relating to the battery 14.

The generator 2, the inverter 4 and the first capacitance 6 are connected to a primary side P of the transformer 8, whereas the second capacitance 10, the rectifier 12 and the battery 14 are connected to a secondary side S of the transformer 8. The communication and control circuit 16 is connected to the inverter 4 and the secondary winding S of the transformer 8 via a secondary control and communication circuit not shown. The first 6 and second 10 capacitances each comprise at least one capacitor.

The battery 14 is suitable for being recharged by a recharging station 18 comprising an electrical energy conversion system 20 according to the invention. The battery 14 is suitable for being recharged according to a charging profile, shown in FIG. 2, which is specific and comprises two steps E1 and E2. During the first step E1, the battery 14 is recharged by a maximum constant charging current $I_{chargemax}$ and a variable charging voltage $U_{charge}$. This voltage $U_{charge}$ increases from the start of step E1 to the end of step E1 to reach, at the end of step E1, a maximum charging voltage $U_{chargemax}$. During the second step E2, the battery 14 is recharged with the maximum charging voltage $U_{chargemax}$ and with a variable charging current $I_{charge}$. This current $I_{charge}$ decreases during the step E2 to reach a quasi-zero current at the end of step E2.

At the end of step E2, the battery is recharged. If unused and left idle for a time R, it undergoes a slight discharge. In this case, an occasional step E' is implemented to recharge the battery 14 in an optimal manner, i.e. so that it is restored to a state similar to the state wherein it was at the end of step E2.

Figure 3:
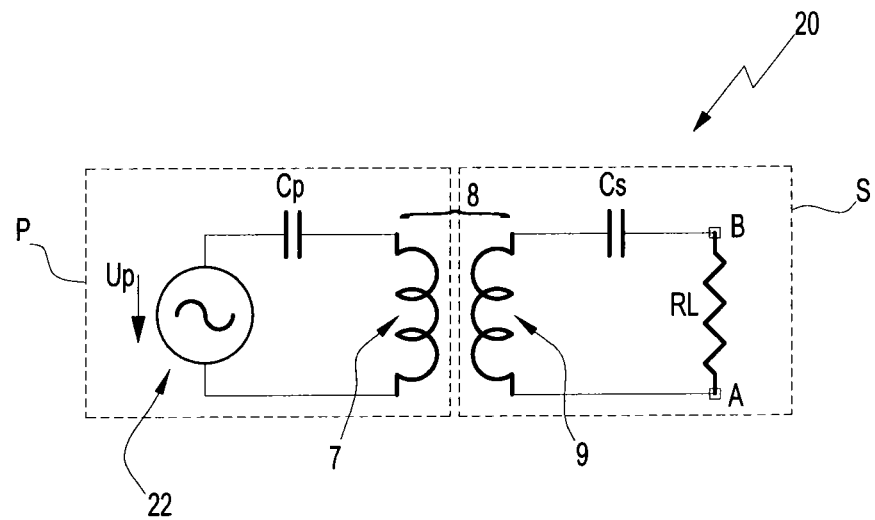
FIG. 3 is an electric circuit representing an electrical energy conversion system having a series-series topology according to the prior art.
Figure 4:
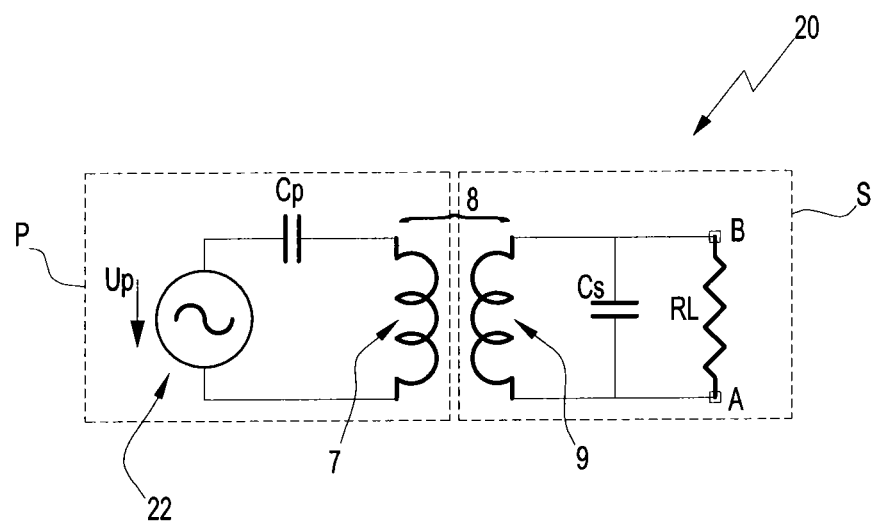
FIG. 4 is an electric circuit representing an electrical energy conversion system having a series-parallel topology according to the prior art.

In the literature, a plurality of topologies for conversion systems 20 are known, including a series-series topology, or SS, shown in FIG. 3, and a series-parallel topology, or SP, shown in FIG. 4. In such SS and SP topologies, a generator 22 of an alternating voltage Up, acting as an alternating voltage source, and a first capacitor Cp are connected to the primary winding 7 of the transformer 8, and a second capacitor Cs and a load resistor RL are connected to the primary winding 9 of the transformer 8. The first Cp and second Cs capacitors are used for the purposes of reactive energy compensation at the operating frequency of the system 20. They are used to increase the output of the system 20.

In the SS topology, the second capacitor Cs is connected in series with the load resistor RL, rendering the electrical energy conversion system 20 suitable for charging a battery 14 at constant current whereas, in the SP topology, the second capacitor Cs is connected in parallel with the load resistor RL, rendering the system 20 suitable for charging a battery 14 at constant voltage.

The alternating voltage source 22, shown in FIGS. 3 to 7, is equivalent to an assembly comprising the direct voltage source 2 and the inverter 4 shown in FIG. 1.

The capacitors Cp and Cs have capacitances which may be determined, according to a model, and according to the topology of the system 20, on the basis of a fixed value of the voltage Up at the terminals of the alternating voltage generator 22. In this way, for an SS topology, the capacitance of the capacitors Cp and Cs are $$\frac{1}{\omega_0^2 \cdot L_p}$$

and $$\frac{1}{\omega_0^2 \cdot L_s},$$

respectively, where $L_p$ is the inductance of the primary winding 7, $L_s$ is the inductance of the secondary winding 9, and $\omega_0$ is the pulsation associated with the signal frequency of the voltage Up. Similarly, for an SP topology, the capacitance values of the capacitors Cp and Cs are equal to $$\frac{L_s}{(L_p L_s - M^2) \cdot \omega_0^2}$$

and $$\frac{L_s}{R_s^2 + L_s^2 \cdot \omega_0^2},$$

where $R_s$ is less than $R_L$ by at least a factor of 100, $R_S$ is the serial resistance of the secondary winding. If the condition "$R_s$ is less than $R_L$ by at least a factor of 100" is not met, Cs equals:

$$\frac{(R_S^2 + L_S^2\omega_0^2)(R_S(R_L + R_S) + L_S^2\omega_0^2)}{L_P R_S^3(R_L + R_S)\omega_0^2 + L_S R_S[M^2(R_L - R_S) + L_P L_S(R_L + 2R_S)]\omega_0^4 + L_S^3(L_P L_S - M^2)\omega_0^6}$$

where M is the mutual inductance between the primary and secondary winding of the transformer and the other terms of the equation are the same as those previously identified.

These values guarantee operation at the system resonance, i.e. a zero phase shift between the primary voltage and the primary current, and a tolerance is acceptable on these values.

For example, for an SS topology, the primary voltage Up equals 100 V, a current Ip through the primary side equals 3.48 A. In this case, an efficiency coefficient N of the system 20 equals approximately 0.86, whereas, without adding the capacitors Cs, Cp, the efficiency coefficient N, would be equal to 0.001. This example illustrates the importance of the reactive energy compensation means which enhance the efficiency coefficient by a factor of almost 1000.

Figure 5:
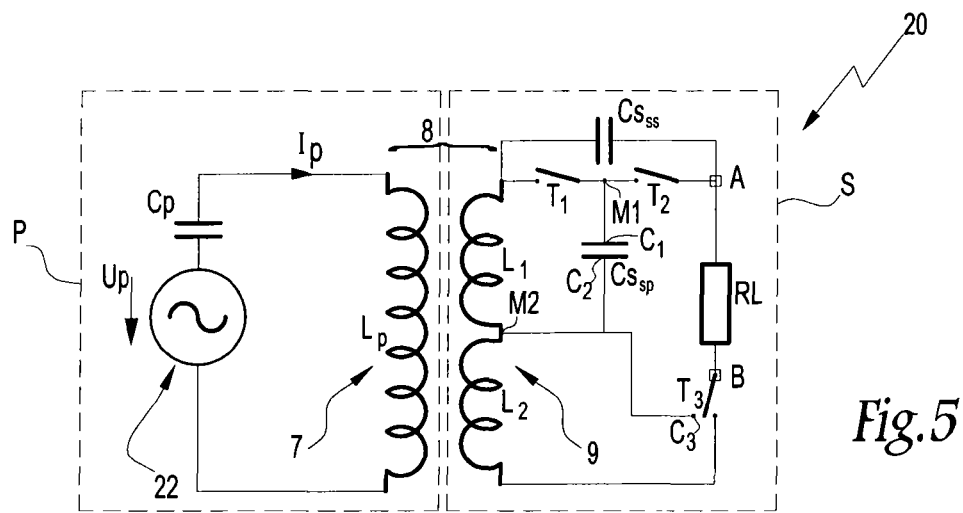
FIG. 5 is an electric circuit of an electrical energy conversion system according to the invention.
Figure 6:
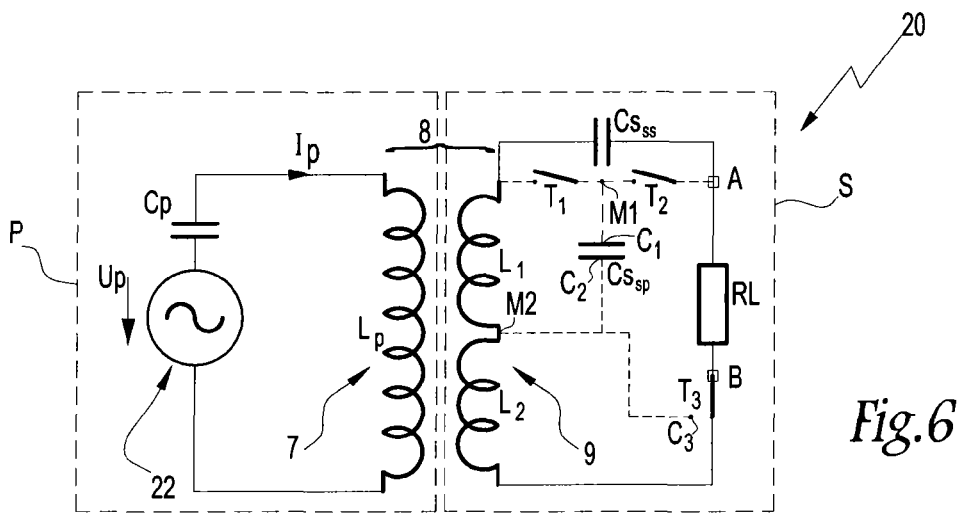
FIG. 6 represents the electric circuit shown in FIG. 5 when it is in a series-series topology.
Figure 7:
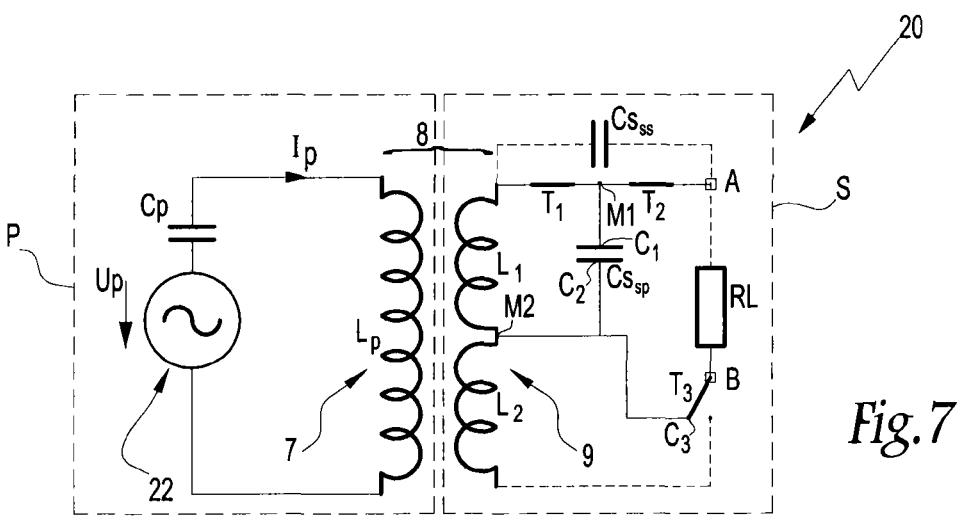
FIG. 7 represents the electric circuit shown in FIG. 5 when it is in a series-parallel topology.

FIG. 5 shows an electrical energy conversion system 20 according to the invention. It comprises a primary side P and a secondary side S. The primary side P comprises the primary winding 7 of the transformer 8, the source 22 of alternative voltage Up and the first capacitor Cp, the first capacitor Cp and the source 22 being connected in series, and each being connected to one of the terminals of the primary winding 7. In FIGS. 5 to 7, the alternating voltage generator 22 represents the association of a direct voltage source and a voltage inverter such as the elements 2 and 4 represented in FIG. 1. In practice, the direct voltage source 2 does not belong to the system 20 supplied with direct voltage, even though the generator 22 is represented in the perimeter of the system 20 in FIGS. 5 to 7, since the inverter 4 belongs to this system in the example described. Lp refers to the inductance of the primary winding 7. The secondary side comprises the secondary winding 9 of the transformer 8, the load resistor RL, a second secondary capacity $Cs_{ss}$, a third secondary capacitor $Cs_{sp}$, two switches T1, T2 and a selector switch T3. L1+L2 refers to the inductance of the secondary winding 9. On the secondary side, A and B refer to the terminals of the load resistor RL, which are the connection terminals of the battery 14 to be charged.

In FIGS. 5 to 7, the load resistor RL represents both the rectifier 12 and the battery 14 in FIG. 1.

A first terminal C1 of the third capacitor $Cs_{sp}$ is permanently electrically connected to a median point M1 situated between the switches T1 and T2. A second terminal C2 of the third capacitor, opposite the first terminal C1, is permanently electrically connected to a median point M2 of the secondary winding 9 and to a terminal C3 of the selector switch T3.

The switching means of the conversion system 20 comprise the switches T1, T2 and the selector switch T3 and are suitable for reversible switching.

The switches T1 and T2 are suitable for being flipped by control means, not shown in the figures, to an open or closed position. The selector switch T3 is suitable for being flipped by the control means to an intermediate position, as shown in FIG. 5, on the right, as shown in FIG. 6, or on the left, as shown in FIG. 7.

In particular, the switching means are suitable for switching, reversibly, between a first configuration SS wherein the second capacitor $Cs_{ss}$ is connected in series between the secondary winding 9 and one of the two connection terminals A (FIG. 6), and a second configuration SP wherein the third capacitor $Cs_{sp}$ is connected in parallel with the secondary winding 9 and between the load connection terminals A, B (FIG. 7). Only the second capacitor $Cs_{ss}$, of the second $Cs_{ss}$ and third $Cs_{sp}$ capacitors, is suitable for receiving the flow of an electric current in the first configuration SS (FIG. 6). Only the third $Cs_{sp}$ capacitor, of the second $Cs_{ss}$ and third $Cs_{sp}$ capacitors, is suitable for receiving the flow of the electric current in the second configuration SP (FIG. 7).

Figure 2:
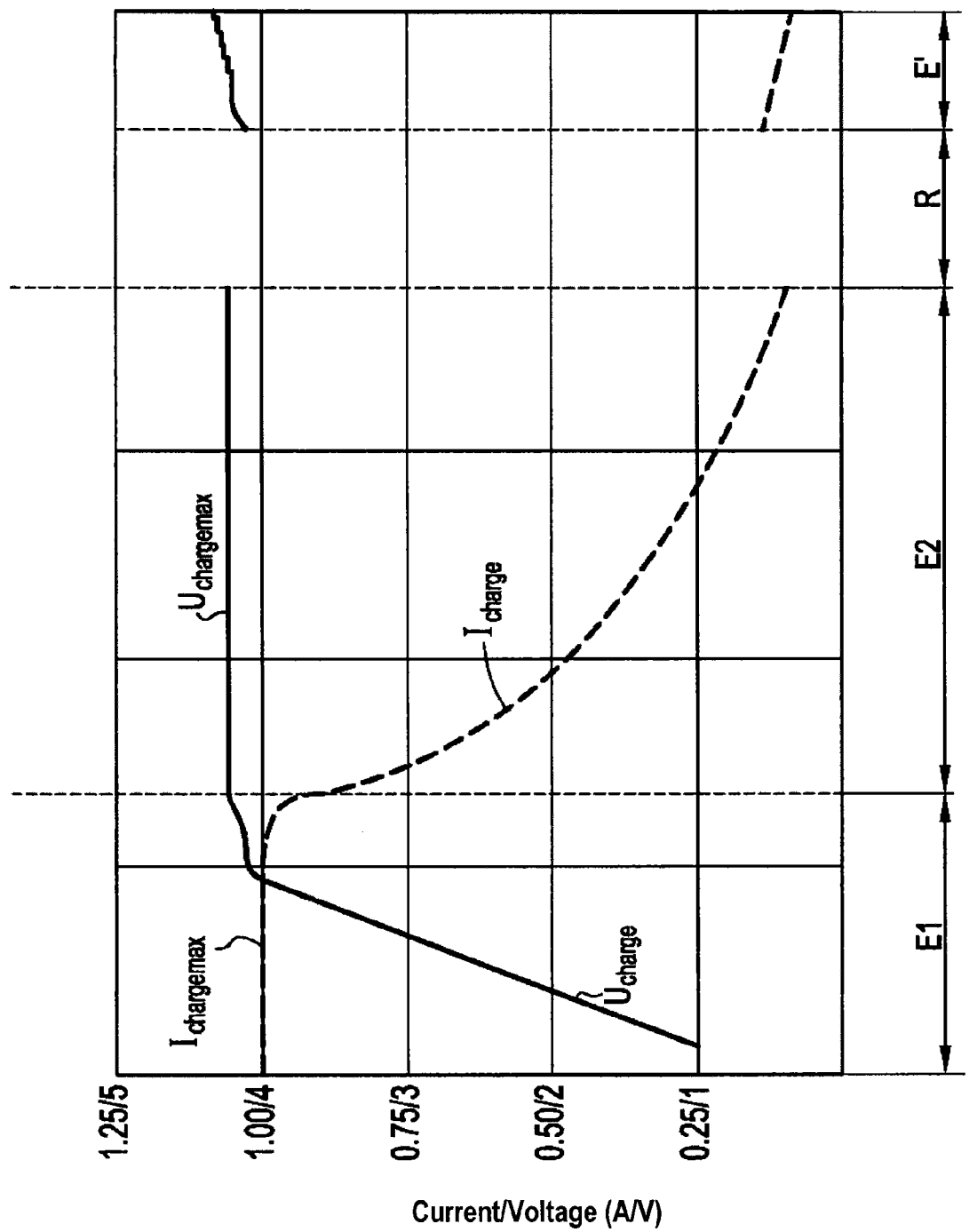
FIG. 2 is an electric battery charging profile.

The control means, not shown, are suitable for controlling the switching means, according to a predetermined control algorithm, particularly as a function of the charging profile represented in FIG. 2.

In order to retrieve the configurations SS and SP as described above and shown in FIGS. 3 and 4, respectively, the control means are suitable for controlling the switches and the selector switch so that the system 20 adopts the first configuration SS or the second configuration SP as required.

In this way, in the first configuration SS shown in FIG. 6, the switches T1 and T2 are open and the selector switch T3 is in the right position. This configuration enables the system 20 to have the configuration SS, i.e. suitable for charging the battery 14 at constant current.

In the second configuration SP shown in FIG. 7, the switches T1 and T2 are closed and the selector switch T3 is in the left position. In this configuration, the terminal B is connected to the terminal C2 of the third capacitor $Cs_{sp}$ and to the median point M2. This configuration enables the system 20 to have the configuration SP, i.e. suitable for charging the battery 14 at constant voltage.

The switching means consisting of the switches T1, T2 and the selector switch T3 are suitable for switching, reversibly, from one configuration to another to adapt to the charging profile of the battery 14, as shown in FIG. 2. In particular, the switching means control algorithm comprises a step for cutting off the current flow between the alternating voltage source 22 and the terminals A and B, when switching from the configuration SS to the configuration SP, and when switching from the configuration SP to the configuration SS. This step for cutting off the current flow is implemented by opening the switches T1, T2 and the selector switch T3, to protect the system 20 from any malfunction.

In practice, the capacitance values of the second and third capacitors $Cs_{ss}$ and $Cs_{sp}$ are chosen accounting for the operating modes thereof, series or parallel, according to a consistent approach which that envisaged above for the values of the capacitor Cs. More specifically, the value of the second capacitor $Cs_{ss}$ is equal to $$\frac{1}{\omega_0^2 \cdot (L_1 + L_2)},$$

whereas that of the third capacitor $Cs_{sp}$ is equal to $$\frac{L_1}{R_S^2 + L_1^2 \cdot \omega_0^2}$$

if $R_S$ is considerably less than $R_L$. Otherwise, the value of $Cs_{sp}$ is equal to $$\frac{(R_S^2 + L_1^2\omega_0^2)(R_S(R_L + R_S) + L_1^2\omega_0^2)}{L_P R_S^3(R_L + R_S)\omega_0^2 +}$$
$$L_1 R_S[M^2(R_L - R_S) + L_P L_1(R_L + 2R_S)]\omega_0^4 +$$
$$L_1^3(L_P L_1 - M^2)\omega_0^6$$

with the same notations as above.

Figure 8:
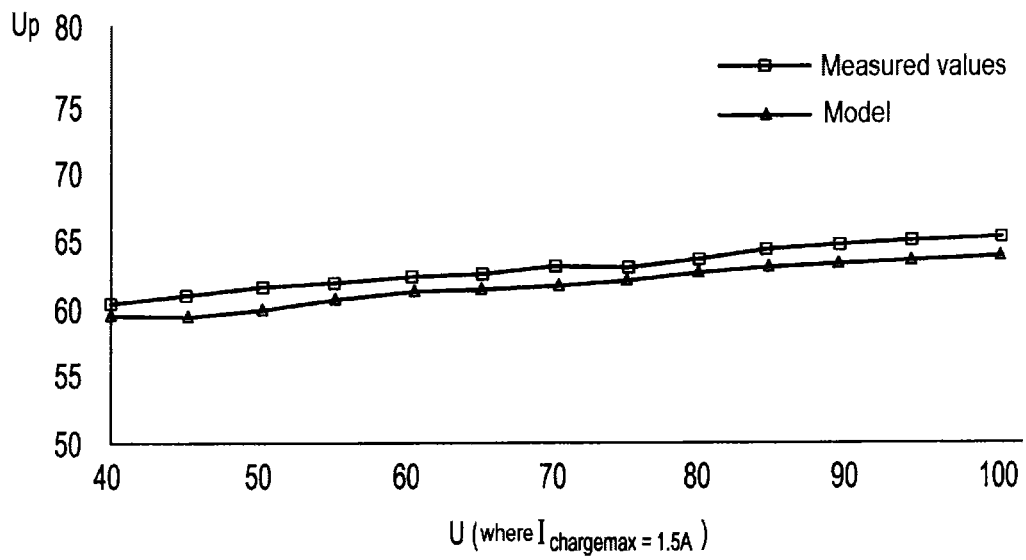
FIG. 8 is a set of curves representing the progression of the voltage on the primary winding of the conversion system according to the invention as a function of the charging voltage, when the converter is in a constant current charging step.

FIG. 8 represents the progression of the primary voltage Up as a function of the charging voltage at constant current, i.e. during the charging step E1, when the system 20 is in the configuration SS. This progression is given for a constant current value $I_{chargemax}$ equal to 1.5 A for a model and for measured experimental values.

Figure 9:
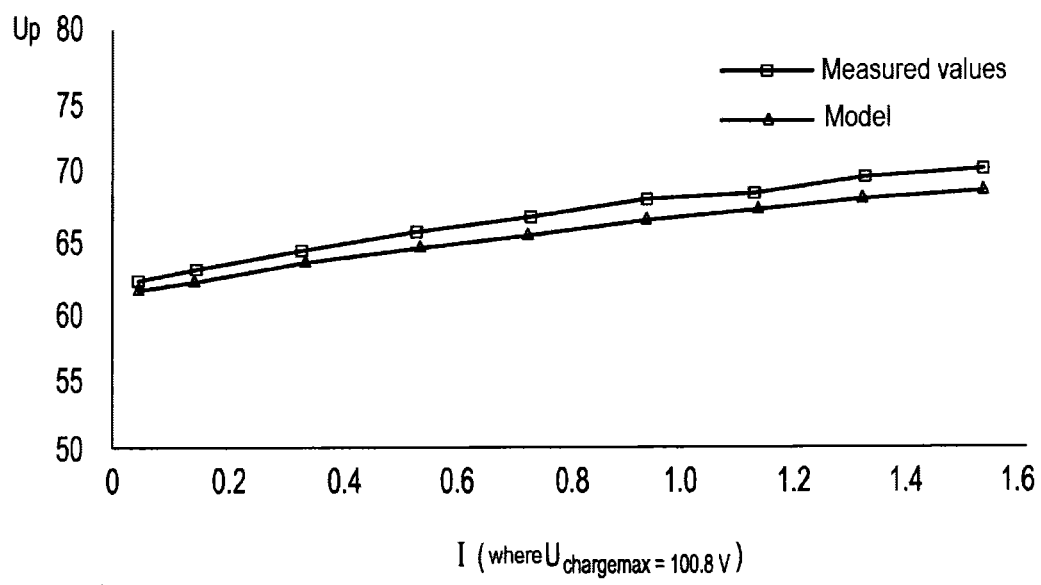
FIG. 9 is a set of curves representing the progression of the voltage on the primary winding of the conversion system according to the invention as a function of the charging voltage, when the converter is in a constant voltage charging step.

FIG. 9 represents the progression of the primary voltage Up as a function of the charging voltage at constant voltage, i.e. during the charging step E2, when the system 20 is in the configuration SP. This progression is given for a constant voltage value $U_{chargemax}$ equal to 100.8 V for a model and for measured experimental values.

In this way, the system 20 according to the invention is suitable, in a conversion chain 1, for simplifying the secondary side S, without adding an additional particular control device. The switching means are situated on the secondary side S of the system 20 and perform switching to adapt the charging of the battery 14 to the nominal and optimal charging profile thereof.

The invention claimed is:

1. An electrical energy conversion system for powering a load using a voltage source, the conversion system comprising:
  a first capacitor, a second capacitor, two load connection terminals and an electrical transformer comprising a primary winding and a secondary winding, the first capacitor being electrically connected to the primary winding, and the connection terminals being electrically connected to the secondary winding,
  wherein the conversion system further comprises a third capacitor and switching means suitable for switching, reversibly, between a first configuration, wherein the second capacitor is connected in series between the secondary winding and one of the two connection terminals, and a second configuration wherein the third capacitor is connected in parallel with the secondary winding and between the connection terminals, only the second capacitor of the second and third capacitors being suitable for receiving the flow of an electric current in the first configuration, whereas only the third capacitor of the second and third capacitors is suitable for receiving the flow of the electric current in the second configuration, the conversion system comprising means for controlling the switching means according to a control algorithm.

2. The electrical energy conversion system according to claim 1, wherein the switching means comprise a first switch connected between the secondary winding and one of the two terminals of the third capacitor, a second switch connected between said terminal of the third capacitor and one of the two connection terminals, and a selector switch connected between the secondary winding and the other terminal of the two connection terminals.

3. The electrical conversion system according to claim 2, wherein the selector switch is configured to be switched between a first position corresponding to the first configuration and a second position corresponding to the second configuration, the first and second switches being open in the first configuration and closed in the second configuration.

4. The electrical conversion system according to claim 2, wherein the selector switch is a three-position switch, the first position corresponding to the first configuration, the second position corresponding to the second configuration and the third position being an idle position wherein no current flows through the selector switch.

5. The electrical conversion system according to claim 1, wherein the control algorithm comprises a step for cutting off the current flow between the voltage source and the connection terminals, when switching from one configuration to another.

6. A recharging station for recharging an electric battery comprising an electrical energy conversion system, wherein the electrical energy conversion system is according to claim 1 and wherein the control algorithm is dependent on a charging profile of the battery.

7. The recharging station according to claim 6, wherein the charging profile comprises a charging step at constant current and a charging step at constant voltage, wherein the charging step at constant current corresponds to the first configuration and wherein the charging step at constant voltage corresponds to the second configuration.

8. The recharging station according to claim 6, wherein it further comprises a voltage rectifier connected between the connection terminals, the voltage rectifier being suitable for outputting a direct voltage to the battery.

9. The recharging station according to claim 6, wherein the voltage source is a direct voltage source and wherein the recharging station further comprises an inverter connected between the direct voltage source and the first capacitor.

10. The recharging station according to claim 9, wherein the recharging station further comprises a control circuit of the inverter and the control circuit controls the inverter according to a phase shift modulation.

* * * * *